US006541544B1

(12) United States Patent
Hart et al.

(10) Patent No.: US 6,541,544 B1
(45) Date of Patent: Apr. 1, 2003

(54) TEXTURED WEATHERABLE POWDER COATINGS

(75) Inventors: Stephen C. Hart, Hudson, WI (US); Jeffrey G. Schmierer, Oakdale, MN (US); Brian W. Carlson, Woodbury, MN (US)

(73) Assignee: H. B. Fuller Licensing & Financing, Inc., St. Paul, MN (US)

( * ) Notice: Subject to any disclaimer, the term of this patent is extended or adjusted under 35 U.S.C. 154(b) by 0 days.

(21) Appl. No.: 09/579,759

(22) Filed: May 26, 2000

(51) Int. Cl.[7] .............................................. C08L 33/02
(52) U.S. Cl. ...................... 523/410; 523/409; 523/412; 525/107; 525/111; 525/119
(58) Field of Search ................................ 523/409, 410, 523/412; 525/107, 111, 119

(56) References Cited

U.S. PATENT DOCUMENTS

| 4,341,819 A | | 7/1982 | Schreffler et al. ............ 427/195 |
| 4,921,913 A | * | 5/1990 | Pettit, Jr. ..................... 525/119 |
| 5,212,263 A | | 5/1993 | Schreffler ..................... 525/533 |
| 5,229,458 A | * | 7/1993 | Schimmel et al. ........... 525/108 |
| 5,494,994 A | | 2/1996 | Gras et al. ................... 528/292 |
| 5,576,389 A | * | 11/1996 | Ueno et al. .................. 525/119 |
| 5,616,658 A | | 4/1997 | Gras et al. ................... 525/438 |
| 5,714,206 A | | 2/1998 | Daly et al. ................... 427/475 |
| 5,721,052 A | | 2/1998 | Muthiah et al. ............. 428/413 |

FOREIGN PATENT DOCUMENTS

| EP | 0503865 | * | 3/1992 |
| EP | 0 911 709 A2 | | 9/1998 |
| GB | 2 312 897 A | | 5/1996 |

* cited by examiner

*Primary Examiner*—Ana Woodward
(74) *Attorney, Agent, or Firm*—Bin Su

(57) ABSTRACT

A thermosetting weatherable powder coating composition applyable to a temperature sensitive substrate by means of electrostatic spray or fluidized bed, and curable at low temperature to form a textured surface to hide irregularities on the surface of the underlying substrate. The powder coating composition includes a hardener with a functionality of 2 or greater capable of reacting with an acid or anhydride functional group, a polymeric coreactant with a functionality of 2 or greater capable of reacting with the hardener, a carboxylic acid functional polyester and optionally, a catalyst, but no texturing agent. The polymeric coreactant is made by polymerizing an ethylenically unsaturated monomer and at least one carboxyl acid functional ethylenically unsaturated monomer or anhydride functional ethylenically unsaturated monomer, and mixtures thereof.

18 Claims, No Drawings

TEXTURED WEATHERABLE POWDER COATINGS

BACKGROUND OF THE INVENTION

1. Field of the Invention

The invention relates to new thermosetting powder coating materials. More particularly, the invention relates to new textured and weatherable powder coating compositions providing a textured surface to mask defects in the surface of an underlying substrate without using a texturing agent, and to the articles containing the same. The powder coating compositions are provided as powdered material, and are adaptable to electrostatic application to conventional substrates and substrates intolerant of high cure temperatures.

2. Description of the Related Art

The preparation and application of powder coating compositions is known in the surface coating art. Powder coatings are considered desirable because they contain little or no organic solvent. They consequently release minimal amounts of volatile organic compounds during storage, application, or cure of the materials. Accordingly concerns related to worker safety, as well as deleterious environmental effects, are minimized.

Historically powder coatings have been used primarily on metal substrates because of the tolerance of such substrates for relatively high cure temperatures and because of the ease with which metal objects may be grounded to provide a target of uniform electrical potential for electrostatic application. More recently, powder coatings have been applied to non-metallic substrates such as plastic and wood, more specifically, medium density fiberboard (MDF). Although some success has been achieved in coating such non-metallic substrates, problems remain. Wood and MDF release water and other compounds as gasses during the high temperature cure associated with traditional powder coatings. This outgassing disrupts the surface of the coating material during flow and cure, resulting in pinholes and other defects in the coating surface. Also, non-metallic substrates often present less uniform substrate surfaces for coating. A smooth coating applied over such a surface may display aesthetically undesirable variations.

One way to effect pleasing coverage of a non-uniform substrate is to provide a coating having a texture that masks the underlying non-uniformity of the substrate. Previously, textured coatings have been prepared by adding inorganic or rubber texturing material to existing powder coatings. However, such efforts have resulted in coatings of relatively poor weatherability.

Various powder coating compositions are described in the patent literature such as EP-A2-911 709 and the following United States patents. U.S. Pat. No. 4,341,819 describes a powder applied in a fusion coating process that yields a low gloss, wrinkled finish of heat reactive epoxy resulting from the use of methylene disalicyclic acid as the curing agent for the epoxy resin; U.S. Pat. No. 5,721,052 describes thermosetting powder coating compositions adapted to form a grainy textured finish on heat sensitive substrates, especially wood products such a particleboard, based on bisphenol A type epoxy resin and a texturing agent. U.S. Pat. No. 5,212,263 describes a powder coating composition forming a textured finish comprising epoxy resin, methylene disalicyclic acid and an imidazole Bisphenol A epoxy resin. U.S. Pat. No. 5,494,994 describes the production of a matt epoxy hybrid powder coating using salts of pyromellitic acid and various amines. U.S. Pat. No. 5,714,206 describes wood electrostatically coated with a thermosetting powder coating system in which a mixture of self-curing epoxy resin and catalyst is made to cure at low temperatures by the addition of a curing agent. The coatings disclosed, however, do not provide the advantageous combination of textures, low cure temperatures, and weatherability of the present invention without using a texturing agent.

SUMMARY OF THE INVENTION

The invention is directed to a textured and weatherable powder coating composition comprising a mixture of a hardener or curing agent with a functionality of 2 or greater capable of reacting with an acid or anhydride functional group, a polymeric coreactant with a functionality of 2 or greater capable of reacting with the hardener, a carboxylic acid functional polyester, and optionally, a catalyst. The polymeric coreactant is made by polymerizing ethylenically unsaturated monomers such as carboxylic acid functional ethylenically unsaturated monomers or anhydride functional ethylenically unsaturated monomers. The powder coating composition can provide a textured and weatherable finish without including a texturing agent.

The invention also includes a robust weatherable coating having a desired textured surface formed by applying the composition to at least one surface of a substrate and curing the same thereon. The invention provides the weatherable textured coating to cover the surface nonuniformities found, such as in wood, MDF and other substrates. Moreover, the invention also includes textured and weatherable coatings having a low-temperature cure characteristic that minimizes the volatilization of compounds within the substrate during cure and thus minimizes disruption of the coating surface.

The composition of the invention is readily applied using conventional means, including electrostatic spray and fluidized bed methods, to various substrates, such as metal and heat sensitive substrates, e.g., plastic and wood substrates, more specifically, medium density fiberboard (MDF). In some embodiments, the composition exhibits a reduced cure temperature, as compared to other embodiments of the invention or conventional textured coating compositions. Among other advantages, such reduced cure temperatures tend to diminish outgassing from some substrates. A reduction in outgassing is associated with reduced disruption of the coating surface during flow, and consequently improved ultimate coating quality.

In a further aspect, the composition and coating of the invention exhibits weatherability, including resistance to ultra-violet light, that is superior to other known textured coating compositions.

DETAILED DESCRIPTION OF THE INVENTION

These favorable physical characteristics result from a composition comprising, a hardener with a functionality of at least 2 that is reactive with an acid or anhyride functional group, a polymeric coreactant that has a functionality of at least 2. The polymeric coreactant is reactive with the aforementioned hardener and includes a substantially ethylenically saturated polymer made by polymerizing ethylenically unsaturated monomers, in which at least one monomer is a carboxylic acid functional ethylenically unsaturated monomer, or an anhydride functional ethylenically unsaturated monomer. The composition does not include a texturing agent. In some embodiments, the composition may also include a catalyst. In addition, The composition may also include a variety of other components such as fillers, pigments, flow control agents and stabilizers, and the like, as would be clear to one of skilled in the art.

The hardeners useful in the invention include glycidyl functional compounds and betahydroxyalkylamides, which react with the carboxylic acid functional group. Examples of glycidyl functional hardeners for weatherable coatings include hydrogenated bisphenol A and bisphenol F epoxy resins, 1,3,5-tris(2,3-glycidyl- propyl) 1,3,5-triazine-2,4,6-(1H,3H,5H)-trione, 1,3,5-tris(2,3-glycidyl-2methyl propyl) 1,3,5-triazine-2,4,6-(1H,3H,5H)-trione, the diglycidyl ester of terephthalic acid and the triglycidyl ester of trimellitic acid. The 1,3,5-tris(2,3-glycidyl- propyl) 1,3,5-triazine-2,4, 6-(1H,3H,5H)-trione is known by those skilled in the art as triglycidyl isocyanurate (TGIC), and is sold under the tradename of PT-810 from Ciba Specialty Chemicals Brewster, N.Y. The 1,3,5-tris(2,3-glycidyl-2methyl propyl) 1,3,5-triazine-2,4,6-(1H,3H,5H)-trione is sold under the tradename MT-239 and is available from Nissan Chemical. The mixture of the diglycidyl ester of terephthalic acid and the triglycidyl ester of trimellitic acid is sold under the tradename of PT-910 by Ciba Specialty Chemicals, Brewster, N.Y. Other glycidyl functional hardeners for weatherable coatings may also include glycidyl functional acrylic resins which may be produced by polymerizing glycidyl functional acrylates alone or in combination with other vinyl monomers, including other acrylic esters, styrene and substituted styrenes, etc. Glycidyl functional acrylate monomers may include glycidyl acrylate, glycidyl methacrylate, beta-methylglycidyl acrylate, beta-methylglycidyl methacrylate, N-glycidyl acrylic acid amide and the like, among which glycidyl acrylate and glycidyl methacrylate are preferred. Examples of commercially available glycidyl functional acrylic resins include Fineclad™TA-244-A by Reichold, Almatex™ PD 7690 by Anderson Co. and GMA 300™ by Estron Chemical Company.

An example of a commercially available betahydroxyalkylamides hardener is the Primid 552 available from EMS-Primid, Sumter, S.C.

The acid and/or anhydride functional polymeric coreactant include those that may have an acid number of from about 20 to about 500 and those that may be produced by polymerizing acid/anhydride monomers such as acrylic acid, methacrylic acid, maleic anhydride with at least one of the following monomers: alkyl esters of acrylic acid or methacrylic acid such as methyl acrylate, ethyl acrylate, normal butyl acrylate, isobutyl acrylate, 2-ethylhexyl acrylate, cyclohexyl acrylate, methyl methacrylate, ethyl methacrylate, normal butyl methacrylate, isobutyl methacrylate, 2-ethylhexyl methacrylate, laurol methacrylate, tridecyl methacrylate, stearyl methacrylate, and cyclohexyl methacrylate, styrene, vinyltoluene, alpha-methylstyrene and beta-methylstyrene, ethylene, propylene, any of the butenes and pentenes, hexene, heptene, octene, etc. Commercially available carboxylic acid and/or anhydride functional coreactants include SMA1440 made by Elf Atochem, Philadelphia, Pa. and the Joncryl SCX-835, SCX-842, SCX-843 and the SCX-848 which are made by S.C. Johnson, Racine, Wis.

The carboxylic acid functional polyesters of this invention include those formed by the condensation reaction of aliphatic polyols, including cycloaliphatic polyols, with aliphatic and/or aromatic carboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylolpropane, and the like. Suitable carboxylic acids and anhydrides include succinic acid, adipic acid, azelaic acid, sebacic acid, dodecanedioic acid, terephthalic acid, isophthalic acid, tetrahydrophthalic acid, hexahydrophthalic acid, trimellitic acid, and anhydrides thereof.

The polyol and the acid or anhydride are reacted together in any ratio provided that an excess of acid over alcohol is used so as to form a polyester which has free carboxylic groups. Preferably, the carboxylic acid polyester have an acid number of from about 20 to about 80, more preferably from about 25 to about 60, and are solid at room temperature. The polyester is further characterized as having a Tg of, preferably, from about 30° C. to about 85° C., and more preferably, from about 40° C. to about 75° C. If the Tg is below 30° C., the polyester and the powder coating composition containing the same tend to be sticky and difficult to handle. If the Tg is above 85° C., the melt flow of the polyester is low and the coating may have poor coverage of the substrate being coated.

The carboxylic acid polyesters may have an acid number of, preferably, from about 20 to about 80 and more preferably from about 25 to about 60. The acid number is measured using the ASTM 4662-98.

Commercially available polyesters suitable for the present invention include the products under the tradename Uralac P5700 sold by DSM Chemical, Zwolle, Netherlands.

The textured thermosetting powder coating composition contains a ratio of the hardener to the sum of said polymeric coreactant and said polyester of between about 0.7 to about 1.5 times the stoichiometric ratio and prefereably between about 0.9 to about 1.3 times the stoichiometric ratio.

In a second aspect, the composition may also include a catalyst that allows the powder coating to cure at temperatures within the range from about 200° F. to about 300° F. The catalyst is selected from the group of acidic and basic compounds, including imidazoles, imidazolines, tertiary amines, organic acid salts of imidazoles, imidazolines and tertiary amines, imidazole adducts with epoxies, quaternary ammonium salts, phosphonium halides, phosphines, phosphites, metal alkoxides, Lewis acids, tin catalysts, and the like. Examples of organic acids which may be used to prepare salts of imidazoles, imidazolines and tertiary amines include acids such as dodecanedioic acid, adipic acid, sebacic acid, terephthalic acid, isophthalic acid, benzoic acid, succinic acid, maleic acid, acetic acid, and 2-ethylhexanoic acid. Examples of suitable compounds include imidazoles such as imidazole, 2-methylimidazole, 2-propylimidazole and 2-phenylimidazole, imdazolines such as 2-phenyl-2-imidazoline and 2-methyl-2-imidazoline, tertiary amines such as 1,4-diaza-[2.2.2]-bicyclooctane, piperidine, morphline, N-methylmorpholine, N-ethylmorpholine, and 4-N,N-dimethylaminopyridine, organic acid salts such as the monosalt and disalt of dodecanedioic acid with 2-phenyl-2-imidazoline, the monosalt and disalt of adipic acid with 2-phenyl-2-imidazoline, the monosalt and disalt of dodecanedioic acid with 2-methyl-2-imidazole, and the monosalt and disalt of adipic acid with 2-methyl-2-imidazole,imidazole adducts with epoxies such as Epicure P-101 (2-methylimidazole adduct with bisphenyl A epoxy resin from Shell Chemical), quaternary ammonium salts such as myrystyltrimethylammonium bromide, benzyltrimethylammonium chloride, benzyltriethylammonium chloride, choline chloride, and tetramethylammonium bromide, phosphonium halides such as ethyltriphenylphosphonium bromide, ethyltriphenylphosphonium iodide, butyltriphenylphosphonium bromide and butyltriphenylphosphonium chloride, phosphines such as triphenylphospine, phosphites such as tri-n-octylphosphite, metal alkoxides such as sodium methoxide and potassium tertiary butoxide, Lewis acids such as boron trifluoride monoethylamine salt, tin catalysts such as stannous octoate, and mixtures thereof. Preferred are 2-methylimidazole, 2-phenyl-2-imidazoline and the monosalt and disalt of dodecanedioic acid with 2-phenyl-2-imidazoline. More preferred is the disalt of dodecanedioic acid with 2-phenyl-2-imidazoline.

Examples of commercially available catalysts include 2-phenyl-2-imidazoline under the tradename Vestagon B-31 made by CreaNova, Inc., Somerset, N.J.; 2-methyl imidazole under the tradename Actiron 2MI made by Synthron, Inc., Morganton, S.C.; myrystyl trimethyl ammonium bromide sold under the tradename Mytab by Zeeland Chemicals, Zeeland, Mich.; ethyltriphenylphosphonium bromide, ethyltriphenylphosphonium iodide, butyltriphenylphosphonium bromide, and butyltriphenylphosphonium chloride, all available from Morton Performance Chemicals, Danvers, Mass.

Pigments and extenders may be added to the powder coating compositions. Examples of pigments that may be added to give the powder coating compositions color include, but are not limited to, titanium dioxide, carbon black, organic and inorganic pigments of any available color, micas, aluminum flakes and the like. Extenders that may be added to the powder coating compositions include, but are not limited to, barium sulfate, calcium carbonate, and the like.

Flow control agents may be added as another component to the powder coatings compositions disclosed. The flow control agents that may be employed in the thermosetting powder coating compositions are exemplified by, without limitation, acrylic resins. These acrylic resins are generally liquids that have been converted to powder form by absorption onto silica-type materials. A preferred flow control agent is an acrylic resin sold under the tradename Resiflow P-67 by Estron Chemical, Inc., which is a 2-propenoic acid, ethyl ester polymer. Another preferred flow control agent is sold under the tradename Benzoin by DSM, Inc., which is a 2-hydroxy-1,2-diphenylethanone crystalline solid that is believed to keep the molten coating open for a suitable time to allow outgassing to occur prior to the formation of the hard set film. The flow control agent is used, preferably, in a range from about 0.2 to about 5 pphr, and more preferably, from about 0.5 to about 2.5 pphr (parts per hundred resin).

Fumed silica and aluminum oxide may also be employed as a powder dry flow additive. An example of fumed silica is sold under the tradename Cab-O-Sil by Cabot Corporation. An example of aluminum oxide is sold under the tradename Aluminum Oxide C by Degussa Corporation.

The composition of the invention is prepared by making a mixture of hardener, polymeric coreactant, polyester, and optionally, catalyst and other ingredients. In one embodiment, the ingredients are provided as chips, flakes, or powder, or mixtures thereof, and are mixed by tumbling in a closed container. The resulting mixture is then introduced into an extruder where it is melt-blended to form a molten extrudate of more or less uniform composition. The typical extruder for the manufacture of powder coatings exhibits a length to diameter ratio of 15:1, and residence time of the material in process within the extruder is within the range from about 10 seconds to about 3 minutes, and typically on the order of 30 seconds. In the examples discussed below, the first and second heat zones of the extruder where set for 100° F. and 250° F. respectively, and the screw speed was approximately 500 RPM.

Another embodiment of the invention includes introducing the unmixed ingredients directly into the extruder, where adequate mixing is achieved directly in the melt-blending step.

Alternatively, the unmixed ingredients may be introduced into a medium-intensity mixer or a high-intensity mixer whereby deagglomeration of powder particles and improved dispersion are achieved prior to introduction of the mixture into the extruder.

Typically, greater uniformity of dispersion of the premix components insures greater uniformity in the qualities of the powder coating which ultimately results.

On emergence from the extruder, the temperature of the extrudate is typically between 180° F. and 300° F. It is immediately cooled, thereby preventing unwanted reaction of the blended ingredients and premature cure of the thermoset material. Cooling is often achieved by extruding the molten material directly into the pinch of a pair of chilled rollers, typically operated between about 35° F. and about 40° F. Contact with the chilled rollers solidifies the extrudate, and forms it into a web approximately ⅛" thick. The material of the web is chipped in a chipper and the chipped material is subsequently ground to a fine powder in a grinder or air classification mill. The resulting powder is sieved through a mesh sieve, and a powder dry flow control agent such as fumed silica or aluminum oxide may be added to improve product stability during storage and shipment.

Although particles of a wide range of sizes are known by those of skill in the art to be useful, the powder of the invention is preferably prepared to have an average particle size of from about 20 microns to about 80 microns.

The powder coating compositions as illustrated in the examples are prepared by first blending all dry ingredients together, then melt mixing the ingredients at a temperature of between about 180 and about 280° F. in a twin screw extruder, such as an APV extruder operating at a screw speed of 500 RPM. Residence time in the extruder may range from about 10 seconds to about 2 minutes, with typical residence times being from about 20 to about 40 seconds. Melt blending is performed under ambient atmosphere. These melt blended powder coating compositions are immediately cooled upon exiting the extruder and then they are broken into small chips. These small chips are then ground in an Alpine mill and passed through a suitable mesh screen depending on the application.

Without intending to be bound by a theory of operation, it is believed that, in general, a powder coating composition is melted after coating onto the surface of a substrate. During the melting process, the particles melt and coalesce into a smooth coating over the surface, eliminating any roughness by filling in the crevices and defects of the surface. Usually, the lower the viscosity of the composition, the more the leveling and the smoother the finished surface. When it is desirable to have a textured coating, the current approach is to use texturing agents in the powder coating compositions. Surprisingly, the compositions of the invention have low viscosity when heated to produce good coverage of exposed surfaces, possess low cure temperature, and make coatings that have varied textured finishes. Thus, for a wood or wood product surfaces, a textured surface is produced without the presence of any texturing agents. It is believed that the combination of the polymers and particularly, of the polymeric coreactant with the polyester, results in incompatibilities that cause stresses to be built up in the powder coating composition during cure. These stresses develop when the coatings are heated and the acid or anhydride groups available in the ethylenically saturated polymeric coreactant and the acid groups in the polyester react with the hardener. Under the process conditions described herewithin, these reactions are believed to cause the formation of discrete domains of ethylenically saturated polymeric coreactant and of polyester, each material being largely absent from the domains of the other. However, stresses existing due to compositional gradients at domain boundaries result in a variety of surface textures in the cured product. This is unexpected since many of these polymers are low in viscosity and it is expected that flow and leveling of these powder coating compositions would occur on heating.

The invention further functions by incorporating ultraviolet stable hardeners and curing agents in order to decrease degradation of the powder coatings when exposed to ultraviolet radiation. In particular the ethylenically unsaturated monomers are fully polymerized to minimize or eliminate sites of ethylenical unsaturation in the polymer backbone where ultraviolet radiation can cause chemical bond breaking reactions. More particularly, polyesters of the invention, which contain no sites of ethylenical unsaturation in the backbone of the polyester, also enhance the ultraviolet stability of the powder coatings of the invention. By utilizing mixtures of the polymeric coreactant made from ethylenically unsaturated monomers and carboxylic acid functional polyesters, surprisingly, textured powder coatings are created.

The texture of the coating can be classified as orange peel, mottled and fine textures.

In addition, the compositions of the invention also provide coatings having good weatherability. Weatherability is tested by measuring the changes in both gloss loss, reported as percent change, and color, reported as dE after aging for an extended periods of time under the following conditions: 63° C. as measured on a black panel and 30% relative humidity using borosilicate filters. For good weatherability, it is preferred that the change in gloss and the change in color after 670 hours is about 30% better, more preferably, about 40% better, and most preferably, about 50% better compared to bisphenol A powder coating compositions, provided that the bisphenol A powder coating compositions and the composition of the invention should have comparable initial gloss and be formulated with conventional pigments.

Having reviewed the nature and preparation of the compositions and coatings of the invention, there follows herewithin, descriptions of various exemplary embodiments thereof. It should be noted that these examples are intended merely as illustrative examples of the invention described above and claimed below, and should in no way be construed to limit the scope of the claims.

EXAMPLES

Examples of the powder coating compositions were electrostatically sprayed onto cold rolled steel panel substrates and onto ¾" medium density fiberboard substrates. An Onoda GX108 powder application gun was used to spray the powder onto the substrates. After being coated with the powder coating compositions, the coated substrates were placed into a forced air electric convection oven. The compositions were cured in a forced air electric convention oven as designated in the following examples.

Table 1 lists examples of the materials comprising the powder compositions of this invention, their function, tradename and manufacturer.

TABLE 1

| Chemical Name | Function in Formulation | Tradename | Manufacturer |
| --- | --- | --- | --- |
| Carboxylic acid functional polyester resin | Polyester | Uralac P5700 | DSM, Inc. Zwolle, Netherlands |
| Carboxylic acid functional acrylic resin | Coreactant | SCX-848 | S. C. Johnson, Racine, WI |
| Styrene maleic anhydride copolymer | Coreactant | SMA 2625 | Elf-Atochem, Philadelphia, PA |
| Ethylene acrylic acid copolymer | Coreactant | Primacor 5990I | DuPont, Wilmington, DE |
| Triglycidyl isocyanurate | Hardener | PT-810 | Ciba Performance Polymers, Brewster, NY |
| Diglycidyl ester of terephthalic acid and triglycidyl ester of trimellitic acid blend | Hardener | PT-910 | Ciba Performance Polymers, Brewster, NY |
| Betahydroxyalkylamide | Hardener | Primid XL-552 | EMS-Primid, Sumter, SC |
| Titanium dioxide | Pigment | RCL-2 | Millenium, Baltimore, MD |
| 2-phenyl-2-imidazoline | Catalyst | Veba B-31 | CREANOVA, Inc. Somerset, NJ |
| 2-methyl imidazole | Catalyst | Actiron 2MI | Synthron, Inc. Morganton, NC |
| 2-methyl imidazole/dodecanedioic acid salt | Catalyst | | H. B. Fuller Company, St. Paul, MN |
| Myrystyl trimethyl ammonium bromide | Catalyst | Mytab | Zeeland Chemicals, Inc. Zeeland, MI |
| Ethyltriphenylphosphonium iodide | Catalyst | ETPPI | Morton, Danvers, MA |
| 2-phenyl-2-imidazoline/dodecanedioic salt | Catalyst | NP-6136 | H. B. Fuller Company, St. Paul, MN |

Examples 1–9

The powder coating compositions in examples 1–9 were produced by mixing the ingredients listed in Table 2 (values shown are parts by weight of the corresponding ingredient). The powder coating compositions were then applied onto cold rolled steel panels and cured for 10 and 30 minutes at 400° F. Gloss was measured by ASTM Test Method D523, Pencil Hardness was measured by ASTM Test Method D3363, MEK resistance was measured by ASTM Test Method D4752-98, Cured Film Tg was measured by ASTM E1356-98 and Particle Size was measured by ASTM Test Method D5861. The textures of the powder coatings were subjectively assessed. The test results are listed in Table 3. As shown by Table 3, a wide variety of 60° glosses and textures are obtained. The textured surfaces of these powder coatings are useful for hiding surface defect.

TABLE 2

| Raw Materials | 1 | 2 | 3 | 4 | 5 | 6 | 7 | 8 | 9 |
| --- | --- | --- | --- | --- | --- | --- | --- | --- | --- |
| P5700 | 70.0 | 70.0 | 93.0 | 70.0 | 70.0 | 93.0 | 70.0 | 70.0 | 75.0 |
| SCX 848 | 30.0 | — | — | 30.0 | — | — | 30.0 | — | — |
| SMA 2625 | — | 30.0 | — | — | 30.0 | — | — | 30.0 | — |
| Primacor 5990I | — | — | 7.0 | — | — | 7.0 | — | — | 25.0 |
| RCL-2 | 30.0 | 30.0 | 30.0 | 30.0 | 30.0 | 30.0 | 30.0 | 30.0 | 30.0 |
| PT810 | 16.7 | 16.9 | 8.9 | — | — | — | — | — | — |
| PT910 | — | — | — | 19.8 | 20.2 | 9.7 | — | — | — |

TABLE 2-continued

| Raw Materials | 1 | 2 | 3 | 4 | 5 | 6 | 7 | 8 | 9 |
|---|---|---|---|---|---|---|---|---|---|
| Primid XL-552 | — | — | — | — | — | — | 13.3 | 13.5 | 9.8 |

TABLE 3

| Test Results | 1 | 2 | 3 | 4 | 5 | 6 | 7 | 8 | 9 |
|---|---|---|---|---|---|---|---|---|---|
| Gloss at 60 degrees (units) | | | | | | | | | |
| 10 minutes cure | 35 | 32 | 69 | 35 | 32 | 69 | 35 | 32 | 69 |
| 30 minutes cure | 15 | 33 | 86 | 15 | 33 | 86 | 15 | 33 | 86 |
| Pencil hardness | | | | | | | | | |
| 10 minutes cure | H | <HB | <HB | H | <HB | <HB | H | <HB | <HB |
| 30 minutes cure | H | <HB | <HB | H | <HB | <HB | H | <HB | <HB |
| MEK resistance (50 double rubs) | | | | | | | | | |
| 10 minutes cure | Fail | Pass | Fail | Fail | Pass | Fail | Fail | Pass | Fail |
| 30 minutes cure | Pass | Pass | Pass | Pass | Pass | Pass | Pass | Pass | Pass |
| Description of texture* | | | | | | | | | |
| 10 minutes cure | F | M | F | F | M | F | F | M | F |
| 30 minutes cure | OP | M | S/OP | OP | M/OP | S/OP | OP | M | S |
| Powder Tg (° C.) | 40.9 | 40.4 | 48.5 | 40.9 | 40.4 | 48.5 | 52.4 | 51.7 | 54.8 |
| Average particle size (microns) | 54.6 | 51.9 | 68.1 | 54.6 | 51.9 | 68.1 | 53.4 | 57.7 | 78.5 |

*F - Fine
*M - Mottled
*OP - Orange Peel
*S/OP - Between Smooth and Orange Peel

Examples 10–15

The powder coating compositions in examples 10–15 were produced by mixing the ingredients listed in Table 4 (values shown are parts by weight of the corresponding ingredient). The powder coating compositions were applied on cold rolled steel panels with a manual spray gun and cured for 10 and 30 minutes at 400° F. In addition, the compositions were also applied to medium density fiberboard under the following conditions:

Substrate: 6" by 6" pieces of MDF (48 lbs/ft³ density) from Allegheny, Kane, Pa.

Preheat: MDF was heated in a Despatch electric oven for ten minutes at a temperature setting of 325° F. The MDF pieces reached a temperature of about 220 to 245° F. during this preheat cycle.

Application: MDF was taken from the preheat oven and coated immediately using an Onoda GX365 electrostatic cup gun. The charge on the powder was 50 to 80 kilovolts. The pattern control air pressure was 0.5 to 2.0 kgf/cm². The delivery air pressure was 0.5 to 2.0 kgf/cm². The temperature of the pieces was about 180 to 235° F.

Cure: Immediately after applying the powder to the MDF pieces, the pieces were hung in a Despatch electric oven for 10 minutes at a temperature setting of about 325° F. The MDF was heated to a temperature of between about 250 to about 290° F. during this cure cycle. After 10 minutes in the oven, the pieces were removed and allowed to cool at ambient conditions.

The test results are listed in Table 5.

TABLE 4

| Raw Materials | 10 | 11 | 12 | 13 | 14 | 15 |
|---|---|---|---|---|---|---|
| P5700 | 70.0 | 70.0 | 70.0 | 70.0 | 70.0 | 70.0 |
| SCX 848 | 30.0 | 30.0 | 30.0 | 30.0 | 30.0 | 30.0 |
| PT810 | 16.7 | 16.7 | 16.7 | 16.7 | 16.7 | 16.7 |
| RCL-2 | 30.0 | 30.0 | 30.0 | 30.0 | 30.0 | 30.0 |
| B31 | 1.25 | — | — | — | — | — |
| ETPPI | — | 1.25 | — | — | — | — |
| 2-MI catalyst | — | — | 1.25 | — | — | — |
| 2-MI salt catalyst | — | — | — | 2.0 | — | — |
| Mytab catalyst | — | — | — | — | 1.25 | — |
| NP-6136 catalyst | — | — | — | — | — | 2.0 |

TABLE 5

| Test Results | 10 | 11 | 12 | 13 | 14 | 15 |
|---|---|---|---|---|---|---|
| Gloss at 60° (units) | | | | | | |
| CRS panels* | 18 | 13 | 14 | 21 | 28 | 21 |
| MDF panels** | 20 | 22 | 20 | 23 | 30 | 34 |
| Pencil hardness | | | | | | |
| CRS panels | 2H | 2H | 2H | 2H | 2H | 2H |
| MDF panels | 2H | 2H | 2H | 2H | 2H | 2H |
| MEK resistance (50 double rubs) | | | | | | |
| CRS panels | Pass | Pass | Pass | Pass | Pass | Pass |
| MDF panels | Pass | Pass | Pass | Pass | Pass | Pass |
| Texture*** | | | | | | |
| CRS panels | F | F | F | F | OP | F |
| MDF panels | F | F | F | F | OP | OP |
| Powder Tg (° C.) | 44.5 | 45.2 | 44.4 | 43.7 | 43.7 | 44.3 |

TABLE 5-continued

| Test Results | 10 | 11 | 12 | 13 | 14 | 15 |
|---|---|---|---|---|---|---|
| Average particle size (microns) | 50.4 | 49.9 | 48.1 | 46.0 | 47.3 | 47.7 |

*CRS - Cold Rolled Steel.
**MDF - Medium Density Fiberboard.
F - fine; OP - orange peel.

Example 16

Accelerated weathering tests were conducted on a textured weatherable powder coating of the invention in comparison with a bisphenol A epoxy/polyester hybrid powder coating. The tests were conducted using an Atlas Ci65A xenon arc weatherometer in accordance with ASTM Test Method G-26, method A. Gloss and color retention was measured after subjecting the coatings to cyclic UV radiation and moisture for between 500 and 1,000 hours. Gloss measurements were made at an angle of incidence of 60 degrees using a BYK Gardner haze gloss meter in accordance with ASTM Test Method D 523. Gloss loss was expressed in terms of percent change. Color measurements were made using a Macbeth Color Eye 7000 Spectrophotometer in accordance with ASTM Test Method E308-99. Color change was expressed in terms of dE values in CIE L a b color space. The results are listed in Table 6.

TABLE 6

| Coating | Textured, Weatherable composition of the invention | Epoxy/ polyester hybrid |
|---|---|---|
| Hours exposure | 670 | 670 |
| Gloss loss (%) | 37.5 | 61.0 |
| Color change (dE) | 1.9 | 4.1 |

As illustrated by the examples, the powder coating compositions of the invention can be formulated to provide coatings with a wide variety of textures, that hide surface defects. Surprisingly, the powder coating compositions can be formulated without using any texturing agents to provide textures that vary from orange peel textures that have various wave amplitude and wavelength to textured coatings. By addition of a catalyst, the powder coating compositions of the invention may be cured at temperatures low enough to be coated on wood and other heat sensitive substrates. The powder coating compositions of the invention can also be formulated to provide coatings that have very good weatherability and resistance to ultraviolet radiation and are suitable for outdoor applications.

What is claimed is:

1. A powder coating composition comprising a mixture of:
   (a) a curing agent for weatherable coatings with a functionality of 2 or greater capable of reacting with an acid or anhydride functional group;
   (b) a polymeric coreactant having an acid or anhydride functionality of 2 or greater capable of reacting with said curing agent, said polymeric coreactant being made by polymerizing ethylenically unsaturated monomers in which at least one monomer is selected from the group consisting of carboxylic acid functional ethylenically unsaturated monomers and anhydride functional ethylenically unsaturated monomers; and
   (c) a carboxylic acid functional polyester, wherein the composition provides a weatherable and textured finish without using a texturing agent.

2. A powder coating composition as defined in claim 1 further comprising a catalyst whereby said composition may be cured at temperatures within a range from about 200° F. to about 300° F.

3. A powder coating composition as defined in claim 2, wherein said catalyst is selected from the group consisting of imidazoles, imidazolines, tertiary amines, organic acid salts of imidazoles, imidazolines or tertiary amines, imidazole adducts with epoxies, quaternary ammonium salts, phosphonium halides, phosphines, alkoxides, Lewis acids, tin catalysts, and mixtures thereof.

4. A powder coating composition as defined in claim 3, wherein said catalyst is selected from the group consisting of 2-methylimidazole, 2-propylimidazole, 2-phenylimidazole, 2-phenyl-2-imidazoline, dodecanedioic acid monosalt or disalt of 2-phenyl-2-imidazoline, dodecanedioic acid monosalt or disalt of 2-methylimidazole, 1,4-diaza-[2.2.2]-bicyclooctane, myrystyltrimethylammonium bromide, ethyltriphenylphosphonium iodide, and mixtures thereof.

5. The powder coating composition described in claim 4, wherein said catalyst is selected from the group consisting of 2-phenyl-2-imidazoline and the disalt of dodecanedioic acid and 2-phenylimidazoline.

6. A powder coating composition as defined in claim 1, wherein the ratio of said curing agent to the sum of said polymeric coreactant and said polyester is within the range from about 0.7 to about 1.5 times the stoichiometric ratio.

7. A powder coating composition as defined in claim 6, wherein the ratio of said curing agent to the sum of said polymeric coreactant and said polyester is within the range from about 0.9 to about 1.3 times the stoichiometric ratio.

8. A powder coating composition as defined in claim 1 wherein said curing agent is selected from the group consisting of glycidyl functional curing agents and betahydroxalkylamide functional curing agents.

9. The powder coating composition of claim 8, wherein said glycidyl functional curing agent is selected from the group consisting of hydrogenated bisphenol A epoxy resins, hydrogenated bisphenol F epoxy resins, 1,3,5-tris(2,3-glycidyl-propyl) 1,3,5-triazine-2,4,6-(1H,3H,5H)-trione, 1,3,5-tris(2,3-glycidyl-2-methyl propyl)1,3,5-triazine-2,4,6-(1H,3H,5H)-trione, the diglycidyl ester of terephthalic acid and the triglycidyl ester of trimellitic acid, glycidyl functional acrylic resins, and mixtures thereof.

10. A powder coating composition as defined in claim 1, wherein said polymeric coreactant is substantially ethylenically saturated and is made by polymerizing monomers selected from the group consisting of acrylic acid, methacrylic acid and maleic anhydride with at least one monomer selected from the group consisting of alkyl esters of acrylic acid and methacrylic acid, styrene, vinyltoluene, alpha-methylstyrene and beta-methylstyrene, ethylene, propylene, butenes, pentenes, hexenes, heptenes and octenes.

11. A powder coating composition as defined in claim 10, wherein said alkyl esters of acrylic acid or methacrylic acid comprises methyl acrylate, ethyl acrylate, normal butyl acrylate, isobutyl acrylate, 2-ethylhexyl acrylate, cyclohexyl acrylate, methyl methacrylate, ethyl methacrylate, normal butyl methacrylate, isobutyl methacrylate, 2-ethylhexyl methacrylate, lauryl methacrylate, tridecyl methacrylate, stearyl methacrylate, or cyclohexyl methacrylate.

12. A powder coating composition as defined in claim 1 wherein said polymeric coreactant has an acid number within the range from about 20 to about 500.

13. A powder coating composition as defined in claim 1, wherein said polyester has an acid number within the range from about 20 to about 80.

14. A powder coating composition described in claim 13, wherein said polyester has an acid number within the range from about 25 to about 60.

15. A powder coating composition as defined in claim 1, wherein said polyester has a Tg within the range from about 30° C. to about 85° C.

16. A powder coating composition as defined in claim 15, wherein said polyester has a Tg of from about 40° C. to about 75° C.

17. A powder coating composition as defined in claim 1, wherein the 60° gloss is up to 90 gloss units.

18. A powder coating composition comprising a mixture of:
  (a) a curing agent chosen from hydrogenated bisphenol A epoxy resins, hydrogenated bisphenol F epoxy resins, 1,3,5-tris(2,3-glycidyl-propyl) 1,3,5-triazine-2,4,6-(1H,3H,5H)-trione, 1,3,5-tris(2,3-glycidyl-2methyl propyl) 1,3,5-triazine-2,4,6-(1H,3H,5H)-trione, diglycidyl ester of terephthalic acid, triglycidyl ester of trimellitic acid, glycidyl functional acrylic resins, betahydroxyalkylamides, and mixtures thereof;
  (b) a polymeric coreactant with an acid or anhydride functionality of 2 or greater capable of reacting with said cuing agent, said polymeric coreactant being made by polymerizing ethylenically unsaturated monomers in which at least one monomer is chosen from carboxylic acid functional ethylenically unsaturated monomers and anhydride functional ethylenically unsaturated monomers; and
  (c) a carboxylic acid functional polyester, wherein said composition provides a weatherable and textured finish without using a texturing agent.

* * * * *